United States Patent [19]
Anderson

[11] 3,878,273
[45] Apr. 15, 1975

[54] PLURAL WATER/AIR CONTACT FOR COOLING WATER CYCLE
[76] Inventor: James H. Anderson, 1615 Hillock Ln., York, Pa. 17403
[22] Filed: Oct. 13, 1972
[21] Appl. No.: 297,393

[52] U.S. Cl. ............... 261/151; 165/110; 261/157; 261/23 R; 261/111; 261/DIG. 11
[51] Int. Cl. .............................................. F28b 3/06
[58] Field of Search .................. 165/110, 111, 125; 261/DIG. 11, 21, 23 R, 147, 148, 149, 151, 111, 157

[56] References Cited
UNITED STATES PATENTS

| 2,137,735 | 11/1938 | Von Der Emde | 261/21 |
| 2,247,514 | 7/1941 | Mart | 261/147 |
| 3,115,534 | 12/1963 | Bottner | 261/DIG. 11 |
| 3,411,758 | 11/1968 | Edmondson | 261/DIG. 11 |
| 3,635,042 | 1/1972 | Spangemacher | 261/DIG. 11 |
| 3,727,679 | 4/1973 | Von Cleve | 165/111 |
| 3,758,088 | 9/1973 | Fordyce | 261/DIG. 11 |

Primary Examiner—Frank W. Lutter
Assistant Examiner—William Cuchlinski, Jr.
Attorney, Agent, or Firm—Cushman, Darby & Cushman

[57] ABSTRACT

A power-producing system includes a working fluid cycle in which the fluid is boiled, expanded in a plurality of turbines exhausting at different pressures, condensed with air-cooled water and returned to the boiler. A reduction in the heat exchange surface area of the condensing portion of the system is achieved when a separate stream of cooling water flows through each of several condensers operating at a temperature appropriate for condensing the vapor from its respective turbine. A reduction in the heat exchange surface area of the ambient air/cooling water contact is achieved by passing each cooling water stream through its own cooling tower flow path constructed to provide the necessary cooling for that stream. A single cooling tower structure may be modified internally to provide plural flow paths separate from each other.

1 Claim, 5 Drawing Figures

PLURAL WATER/AIR CONTACT FOR COOLING WATER CYCLE

This invention relates to improvements in the efficiency of heat exchange cycles and in particular to improvements in heat exchange cycles wherein a recycled stream of cooling water is cooled by contact with ambient air.

The invention may be best illustrated in conjunction with a power-producing system of the kind in which a working fluid is boiled, expanded (as in a plurality of turbines) to produce power, condensed by indirect heat exchange with a stream of cooling water and returned to the boiler and in which the cooling water is cooled in a cooling tower or the like and returned to the condensing means for the working fluid. However, the broader aspects of the invention are applicable to the air cooling of any recycled cooling water stream.

The broad object of the invention is to maintain in a given system a stream of recycled cooling water at a desired temperature using direct heat exchange with ambient air while maintaining surface contact area between the water and the air at a minimum. That is, it is the broad object to reduce the size (the area of water/air contact) of a cooling tower or the like without reducing the amount of heat transferred. This is achieved broadly, by flowing the stream of warm cooling water sequentially through a plurality of water/air contact devices, each of which receives a separate ambient air stream which is discharged independently to the atmosphere.

The separate cooling just referred to may be carried out in separate cooling towers or in a special single cooling tower structure designed to maintain the water streams separate.

The ambient air cooling system summarized in the preceding two paragraphs has particular utility in a special power-producing system in which a working fluid is expanded in turbines or other power-producing machines operated at different exhaust pressures (temperatures). Under these conditions, in addition to the improved cooling tower performance discussed above, the total area of heat exchange surface in the condensers for the working fluid can be made smaller for a given total amount of heat transfer in the condensers. In addition, the theoretical power output of the turbines is also slightly higher than for system in which the turbines operate at the same exhaust pressure (temperature).

The invention will be further understood from the following more detailed description of several illustrative embodiments taken with the drawings in which.

Figure 1:
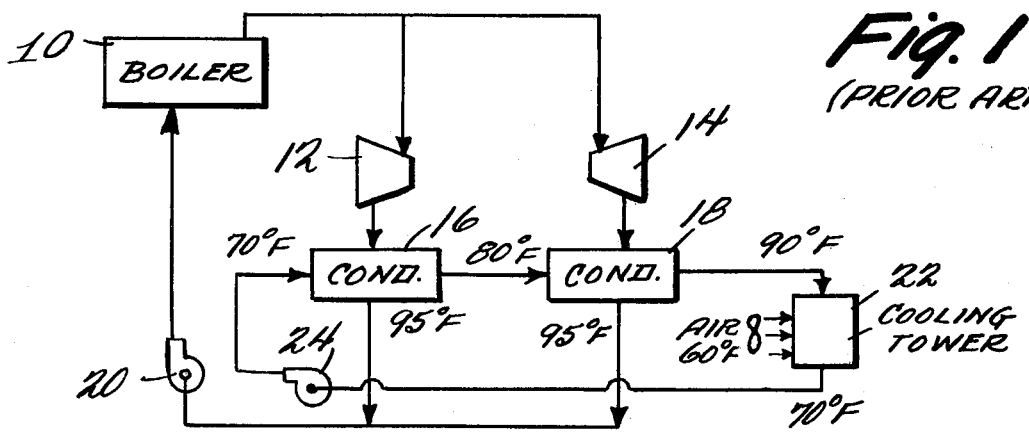
FIG. 1 is a schematic diagram of a prior art power-producing system in which condenser cooling water is recycled through a cooling tower.

Referring to FIG. 1, there is shown an illustrative power-producing system of the type which includes a boiler 10, a plurality of identical work-producing turbines 12 and 14 connected in parallel, condensers 16 and 18 corresponding to the turbines 12 and 14 and a pump 20 for returning the working fluid from both condensers to the boiler 10. The condensers 16 and 18 may be conventional tube-type heat-exchangers. The cooling fluid is water which flows through the condenser 16 and 18 in series, then to a cooling tower 22 of conventional construction and back to the condenser 16 by way of a pump 24.

Illustrative temperatures for the system are given in FIG. 1, assuming a suitable working fluid such as isobutane. It will be seen that both turbines 12 and 14 are shown as operating at the same exhaust pressure and temperature (95°F) with the result that both condensers 16 and 18 condense the isobutane at about 95°F. Since the cooling water flows through the condensers in series, the downstream condenser 18 will receive water at a higher temperature than the upstream condenser 16 and will require a larger heat transfer area in order to remove the same amount of heat as the upstream condenser 16. Typical cooling water temperatures may be 70°F from the cooling tower 22, 80°F from the upstream condenser 16 and 90°F from the downstream condenser 18.

Another prior art system (not shown) is one similar to the FIG. 1 system except that both turbines 12 and 14 operate at the same exhaust temperature and the condensers operate at the same temperature and receive cooling water in parallel from the cooling tower 22.

Figure 2:
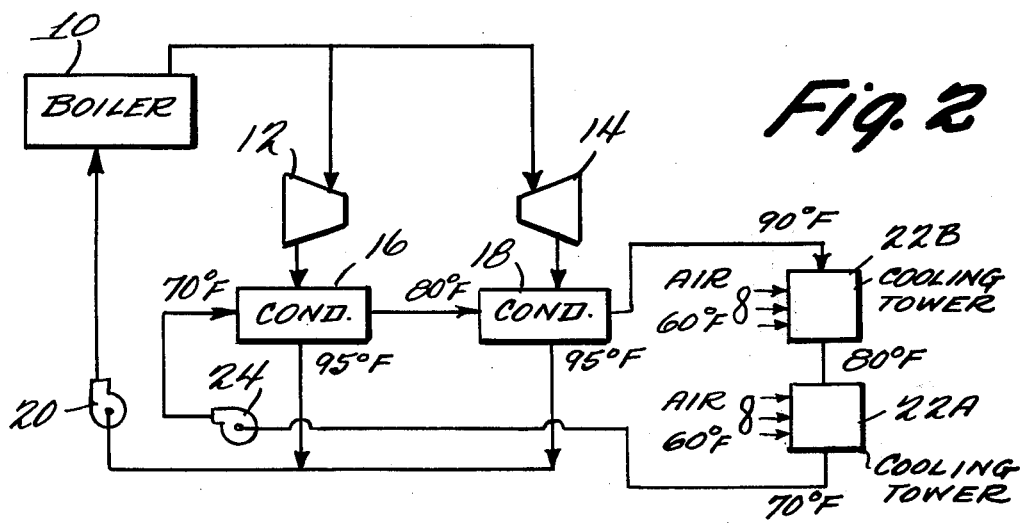
FIG. 2 is a schematic diagram of the power-producing system of FIG. 1 modified to include sequential cooling towers in accordance with the principles of the present invention.

FIG. 2 illustrates a power-producing system which is the same as that of FIG. 1 except that plural sequential cooling towers 22B and 22A are employed. It has been found that for a given total heat transfer to the atmosphere from a stream of water at a given temperature, the total surface area contact required between the stream of water and the ambient air is reduced when the stream of water passes through series-connected water/air contact devices rather than through a single contact device. Thus, in FIG. 2, the stream of 90°F cooling water from the condenser 18 passes first through the cooling tower 22B, so as to be cooled to 80°F, and then flows through the cooling tower 22A so as to be cooled to the required 70°F.

With respect to the advantages of the plural sequential cooling tower arrangement of FIg. 2, it will be in order to first discuss some basic principles of water/ambient air contact devices. Such devices, for example, cross flow cooling towers, are well known means for cooling a liquid such as water by pumping it to the top of a tower and allowing it to trickle down through an open bed to a bottom pan disposed beneath the bed for collecting the cooled liquid. The liquid is cooled by releasing a portion of its heat to ambient air which either flows naturally or is forced past the open bed under the action of a fan.

As is well known to those skilled in the cooling tower art, the cooling capacity of a cooling tower is primarily dependent upon three factors, the wet bulb temperature of the air entering the tower, the temperature of the liquid entering the tower and the temperature of the liquid leaving the tower.

The liquid temperature leaving the tower minus the wet bulb temperature is called the "approach" in the cooling tower art while the liquid entering temperature minus the liquid exiting temperature is called the "range".

For a given type of cooling tower design the relative surface area depends upon, and therefore can be plotted on charts as a function of, the relative valves of wet bulb air temperature, approach and range. Such charts, which are called performance charts, are conveniently available for wet bulb temperatures of 60°F, 70°F and 80°F.

Referring again to FIG. 1, it will be seen that a single cooling tower is utilized to cool the water which flows in series through the condensers 16 and 18. Given the design criteria for the system, namely the water temperatures required at the beginning and end of the series of condensers and the ambient air wet bulb temperature, it is possible to determine from the above-described charts the relative surface area required for the cooling tower beds.

In the case shown in FIG. 1 the approach would be 70°F − 60°F or 10°F, the range 90°F − 70°F or 20°F and the wet bulb air temperature 60°F. Thus, the relative area factor for the single cooling tower can be seen from the Table 1 below to be 2.64.

A similar observation may be made with respect to the system of FIG. 1 modified to have parallel water flow to the condensers.

In FIG. 2, however, the water from the condenser 18 flows in sequence through cooling towers 22B and 22A. Tower A Approach = 70°F − 60°F or 10°F, Range = 80°F − 70°F or 10°F and ambient air wet bulb temperature = 60°F. Thus, from Table 1 the relative area factor for Tower 22A is 1.60.

For Tower B, the approach is 80°F − 60°F or 20°F while the range is 90°F − 80°F or 10°F. Table 1 shows the relative area for Tower B to be 0.615 for these values: Adding the relative areas of Towers A and B gives the sum 2.215 which is only 83.8% of the 2.64 relative area required by the single tower of FIG. 1.

These calculations do not represent an isolated example but rather the normal situation as can be seen from Table 1. This Table consistently shows that the dual system uses less area at all operating conditions.

In addition, the Table also shows that the advantage of a dual tower system over the single tower system increases in inverse proportion to the approach values. This is important because better power plant efficiencies can be developed with lower approach values, i.e., lower water temperature delivered to the condensers for a given ambient air temperature, so it would be advantageous to design cooling towers in this range.

It should be understood that the plural cooling technique discussed above contemplates contact of a given stream of water with a stream of ambient air which is brought into the contact device from outside and is discharged back to atmosphere at the temperature and humidity which results from the contact with the water stream. That is, it is necessary to employ separate contact devices or their equivalent (as described hereinafter with regard to FIGS. 3 and 4). Merely employing a taller cooling tower does not achieve the same result, because the portions of the air passing through different vertical portions of the downwardly flowing water mix with each other before being discharged to atmosphere.

In order to gain the advantage of two separate cooling

TABLE 1

| WET BULB | DESIGN ARRGMT | TOWER | WATER TO TOWER | WATER OFF TOWER | RANGE | AP-PROACH | RELATIVE AREA FACTOR | RATIO OF AREA OF DUAL TO AREA OF SINGLE |
|---|---|---|---|---|---|---|---|---|
| 60 | SINGLE | | 90 | 70 | 20 | 10 | 2.64 | |
| | DUAL | A | 80 | 70 | 10 | 10 | 1.60 | 2.215/2.64 = .838 |
| | | B | 90 | 80 | 10 | 20 | .615 | |
| 60 | SINGLE | | 80 | 70 | 10 | 10 | 1.42 | |
| | DUAL | A | 75 | 70 | 5 | 10 | .722 | .827 |
| | | B | 80 | 75 | 5 | 15 | .452 | |
| 60 | SINGLE | | 75 | 65 | 10 | 5 | 3.04 | |
| | DUAL | A | 70 | 65 | 5 | 5 | 1.60 | .763 |
| | | B | 75 | 70 | 5 | 10 | .722 | |
| 60 | SINGLE | | 85 | 65 | 20 | 5 | 5.42 | |
| | DUAL | A | 75 | 65 | 10 | 5 | 3.03 | .720 |
| | | B | 85 | 75 | 10 | 15 | .846 | |
| 60 | SINGLE | | 95 | 75 | 20 | 15 | 1.68 | |
| | DUAL | A | 85 | 75 | 10 | 15 | .847 | .784 |
| | | B | 95 | 85 | 10 | 25 | .470 | |
| 70 | SINGLE | | 100 | 80 | 20 | 10 | 1.91 | |
| | DUAL | A | 90 | 80 | 10 | 10 | 1.13 | .850 |
| | | B | 100 | 90 | 10 | 20 | .496 | |
| 70 | SINGLE | | 90 | 80 | 10 | 10 | 1.00 | |
| | DUAL | A | 85 | 80 | 5 | 10 | .500 | .832 |
| | | B | 90 | 85 | 5 | 15 | .332 | |
| 70 | SINGLE | | 85 | 75 | 10 | 5 | 2.02 | |
| | DUAL | A | 80 | 75 | 5 | 5 | .995 | .741 |
| | | B | 85 | 80 | 5 | 10 | .500 | | towers without having to duplicate foundations, pump and fans, the present invention also contemplates a special single cooling tower (FIGS. 3 and 4) constructed to maintain the water streams separate and sequential.

Figure 3:
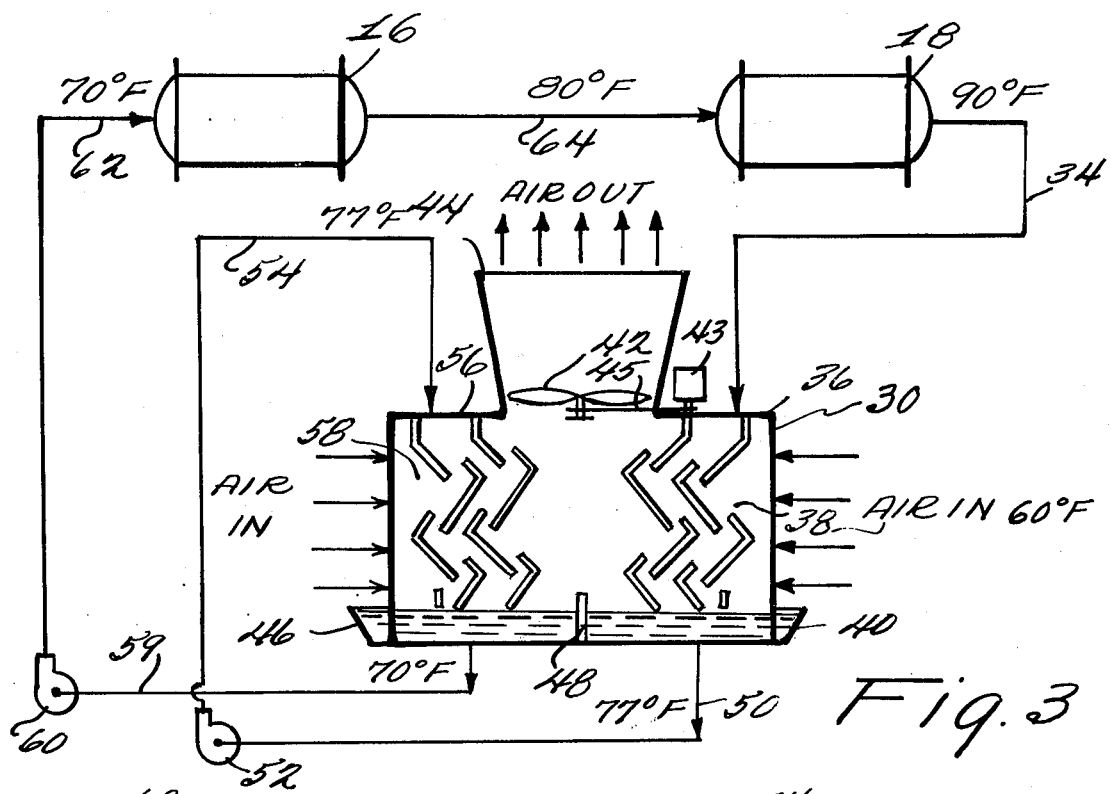
FIGS. 3 and 4 are schematic vertical sectional views of two forms of cooling towers constructed in accordance with the more specific principles of the present invention to provide sequential cooling paths.
Figure 4:
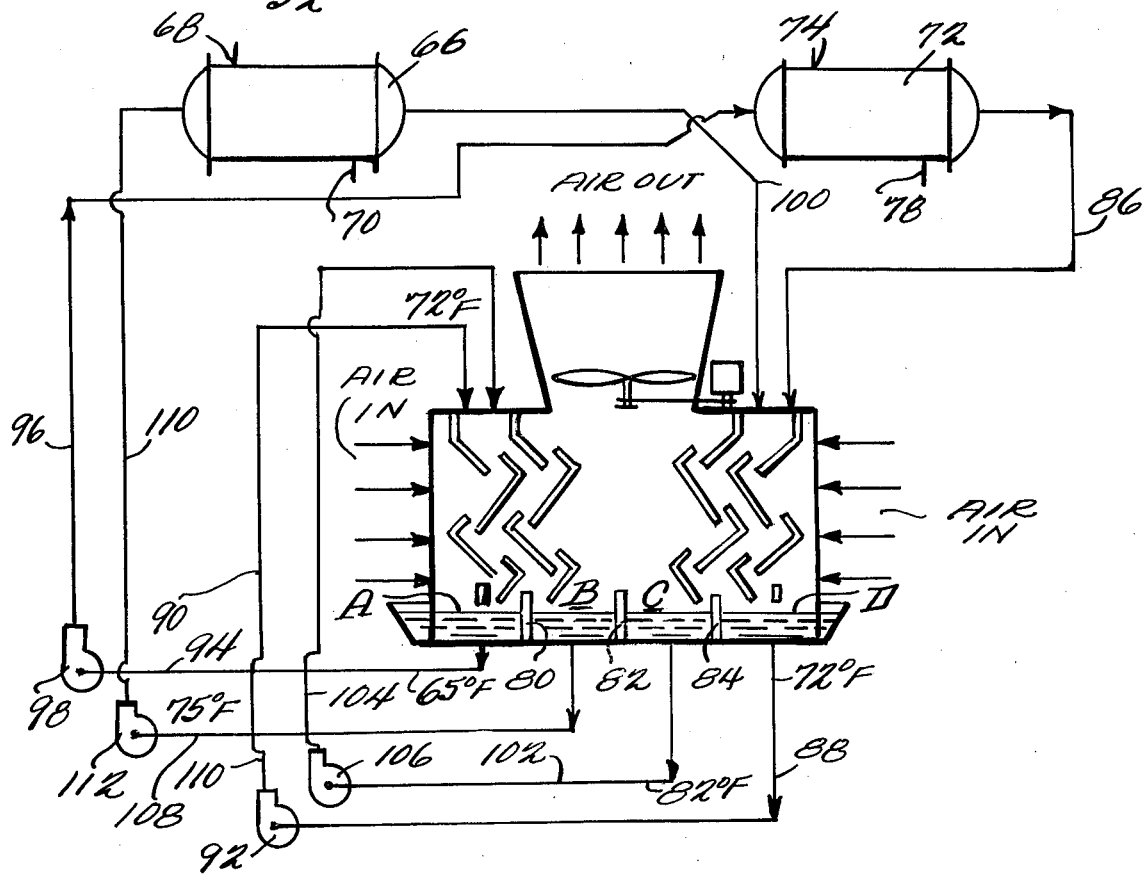

As can be seen from FIG. 3, a special cooling tower 30 is used to cool a stream of water, such as the stream which flows from the condenser 18 of FIG. 2. It is seen that starting at the water outlet from condenser 18, the water flows through conduit 34 to the right top portion 6 of the cooling tower 30. The water then under the influence of gravity follows the path of the open bed 38 to the right bottom pan portion 40. The cooling tower 30 is of special double flow design wherein air enters the cooling tower from at least two sides and exits through a single fan 42 suspended within the exit duct 44 at the top of the cooling tower and driven by motor 43 through belt 45. The right portion 40 of the bottom pan is separated from left portion 46 by divider 48, the right hand portion of the cooling tower therefore acts as a separate cooling tower having, for the illustrated temperatures, an approach of 17°F, a range of 13°F, and a wet bulb temperature of 60°F which requires a relative surface area of about 1.0.

The water exiting from portion 40 flows through a short conduit 50 to pump 52 which need be only large enough to boost the water through conduit 54 to the left top portion 56 of the cooling tower 30. The water then passes down the left open bed 58 and is collected in the left portion 46 of the bottom pan from which it is removed through conduit 59 by pump 60 and passes through conduit 62 to the upstream end of condenser 16. Conduit 64 connects condenser 12 to condenser 18.

For the reasons stated above, the left hand position of the cooling tower also acts as a separate cooling tower having an approach of 10°F and a range of 70°F and a wet bulb temperature of 60°F which requires a relative surface area of about 1.0.

Thus the cooling tower 30 need have a total relative surface area of 2.0 which is only 75.8% of that required by the single cooling tower disclosed in FIG. 1 to fulfill the same process requirements.

While the embodiment shown in FIG. 3 is highly suitable where the same cooling water flows in series through a plurality of condensers, it is sometimes desirable to use different flows to different condensers. This would, for example, be desirable where it is desired to use a single cooling tower to cool plural condensers which are used in plural processes. Thus, in FIG. 4 condenser 66 may be used to condense a first fluid which passes into the condenser through inlet 68 and exits therefrom through outlet 70. Similarly, condenser 72 may be used to condense a second fluid which passes into the condenser through inlet 74 and exits through outlet 78.

In this second situation the cooling tower 30 can be divided into four cooling circuits by the provision of the three dividers 80 and 82 and 84. The four sections which, reading left to right, may be called A, B, C and D operate in the following manner:

Water at 85°F passes from the downstream water end of condenser 72 via conduit 86, is cooled to 72°F in section D, is recycled via conduits 88 and 90 and pump 92 to section A where its cooling continues to 65°F and then passes via conduits 94, 96 and pump 98 to the upstream water end of condenser 72. Likewise, water passes from the downstream end of condenser 66 at 95°F via conduit 100 to section C where it is cooled to 82°F and then it is recycled via conduits 102, 104 and pump 106 to section B where cooling continues to 75°F. The water then passes from section B via conduits 108, 110 and pump 112 to the upstream water end of condenser 66.

Savings in surface area over that required by two separate condensers which would fulfull process conditions more than offset the cost of additional pumps 92 and 106 and conduits 88, 90, 102 and 104, while the cost of operating these pumps is more than offset by the fact that only one fan 112 driven by a single motor 114 through a single belt 113 is required rather than plural sets of each of these elements. This is especially true since the pumps 92 and 106 need only be sized to boost water, at the appropriate rate, to approximately the height of the cooling tower 10.

Figure 5:
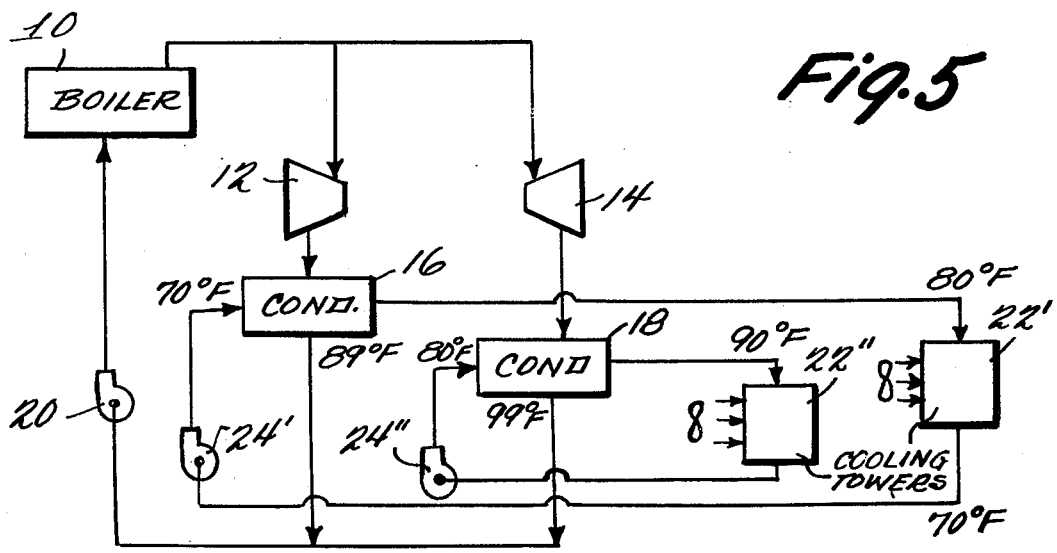
FIG. 5 is a schematic diagram of a special power-producing system in which reduced cooling tower size is achieved by maintaining separate cooling water streams at different temperatures.

Turning to FIG. 5, there is shown a special system which in accordance with the principles of the present invention provides the advantages of reduced heat transfer area in both the condenser portion and the water/air contact portion. In this system the turbines 12 and 14 operate at different exhaust pressures (temperatures) and the condensers 16 and 18 therefore must condense the working fluid vapor at different temperatures. The cooling water streams are at different temperatures, and the stream to each condenser is maintained separate from the other stream. As illustrated, the cooling water from the condenser 16 passes to a first cooling tower 22' and back to the condenser 16 by way of a pump 24'. The cooling water from the condenser 18 passes to a second cooling tower 22" and back to the condenser 18 by way of a pump 24".

The system of FIG. 5 is capable of operating with less total heat transfer area in the condensers 16 and 18 than the systems of FIGS. 1 and 2 for the same power output. This can be established by calculation.

With respect to the reduced size of the condensing portion required in the system of FIG. 5, reference is made to the logarithmic mean temperature difference (LMTD) of the condensers 16 and 18. As is known in the heat exchanger art, this characteristic is the average effective temperature difference between the two streams of fluid passing through a heat exchanger. Thus, using this variable in the well-known heat transfer equation $Q = AU\,t$, it is apparent from inspection that for a given rate of heat transfer in heat units per unit of time (Q), the heat transfer surface area (A) can be reduced if the LMTD (that is, T) can be increased. U is a heat transfer coefficient, constant for a given system. The LMTD is calculated by the known equation:

$$\text{LMTD} = \frac{\text{GTD} - \text{LTD}}{\ln \frac{\text{GTD}}{\text{LTD}}}$$

where GTD is the greatest temperature difference between fluid streams, LTD is the least temperature difference and $\ln$ is the logarithm to the base $e$. When this calculation is carried out on the condensers of FIGS. 1 and 2, it is found that the value of the LMTD's for the condensers of the FIG. 5 system (LMTD = 13.4) are higher than for the condensers of FIGS. 1 and 2 (LMTD = 12.4). Therefore, for a given operating state (i.e., for a given power output and a corresponding heat transfer rate, Q) the condensers of the FIG. 5 system may be made smaller than for the systems of FIGS. 1 and 2. It is also true that for an average condensing temperature of 94°F, as in the FIG. 5 system, the turbines will produce slightly more power than for a condensing temperature of 95°F, as in FIGS. 1 and 2.

The cooling towers 22' and 22'' of FIG. 5 are a special case of the dual cooling concept discussed earlier. The structural difference is, of course, that in FIG. 5 each cooling tower 22' and 22'' receives a separate stream of cooling water from its respective condenser. The total contact surface between water and ambient air for this system is the same as for the system of FIG. 2, based on Table 1. While the cooling towers 22' and 22'' are shown as separate structures, it will be appreciated that the piping of either FIG. 3 or FIG. 4 can be modified to maintain separate water streams through the different contact portions of these towers.

What is claimed is:

1. In a cooling water system of the kind in which a stream of cooling water is recycled between (1) a heat exchange means in which the water is heated to a generally uniform first temperature and (2) cooling means in which the water is cooled to a second generally uniform temperature by contact with ambient air under conditions of high surface area contact between water and air, the improved cooling means which comprises a plurality of water/air contacting devices disposed in a horizontal plane, at least two of said contacting devices being disposed on opposite sides of a common vertical air discharge passage, each of said two contacting devices passing a stream of ambient air into direct heat exchange contact with a stream of water flowing through the respective device and both said two contacting devices passing their air streams into said common vertical air discharge passage, and means for flowing the stream of water sequentially through said two contacting devices to cool the stream step-wise to said second temperature.

* * * * *